US008685255B2

(12) United States Patent
Knapp et al.

(10) Patent No.: US 8,685,255 B2
(45) Date of Patent: Apr. 1, 2014

(54) METHOD OF REGENERATING A CAPACITIVE DEIONIZATION CELL

(75) Inventors: Sean Knapp, Elkton, MD (US); Marshall L. Leffew, II, Earleville, MD (US)

(73) Assignee: Voltea B.V., Sassenheim (NL)

( * ) Notice: Subject to any disclaimer, the term of this patent is extended or adjusted under 35 U.S.C. 154(b) by 252 days.

(21) Appl. No.: 12/557,560

(22) Filed: Sep. 11, 2009

(65) Prior Publication Data

US 2010/0065511 A1     Mar. 18, 2010

Related U.S. Application Data

(60) Provisional application No. 61/096,907, filed on Sep. 15, 2008.

(51) Int. Cl.
*C02F 1/48* (2006.01)

(52) U.S. Cl.
USPC ..... 210/748.01; 210/98; 210/103; 210/321.6; 210/746; 210/653; 210/652; 210/195.2; 210/243; 204/155; 204/520; 204/164; 204/450; 204/518; 429/428; 429/430; 429/431; 429/93; 429/101; 422/121; 422/24; 422/186.3; 422/186.01; 422/20; 205/687; 205/342; 205/688; 205/693; 205/742

(58) Field of Classification Search
USPC ........... 210/748.01, 746, 98, 103, 321.6, 652, 210/653, 195.2; 422/20; 204/542, 551, 155, 204/155.17, 164, 450, 518, 520–539, 554, 204/194, 280, 288, 288.1, 660, 290.1, 204/290.13, 290.3, 665; 205/687, 742, 342, 205/688, 693, 743, 746, 749, 771; 429/428, 429/430, 431, 93, 94, 101, 133, 140, 164, 429/165, 129, 122, 400
See application file for complete search history.

(56) References Cited

U.S. PATENT DOCUMENTS

| | | |
|---|---|---|
| 5,192,432 A | 3/1993 | Andelman |
| 5,196,115 A | 3/1993 | Andelman |
| 5,200,068 A | 4/1993 | Andelman |
| 5,360,540 A | 11/1994 | Andelman |
| 5,415,768 A | 5/1995 | Andelman |
| 5,425,858 A | 6/1995 | Farmer |
| 5,538,611 A | 7/1996 | Otowa |
| 5,547,581 A | 8/1996 | Andelman |
| 5,620,597 A | 4/1997 | Andelman |
| 5,748,437 A | 5/1998 | Andelman |

(Continued)

FOREIGN PATENT DOCUMENTS

| | | |
|---|---|---|
| CN | 1788831 | 6/2006 |
| WO | 2006/050079 | 5/2006 |
| WO | WO 2008/094367 | 8/2008 |

OTHER PUBLICATIONS

International Search Report PCT/US2009/005113.

(Continued)

*Primary Examiner* — Joseph Drodge
*Assistant Examiner* — Cameron J Allen
(74) *Attorney, Agent, or Firm* — Pillsbury Winthrop Shaw Pittman LLP

(57) ABSTRACT

A method of operating a capacitive deionization cell using a regeneration cycle to increase pure flow rate and efficiency of the cell.

9 Claims, 6 Drawing Sheets

Exploded view of the materials used for CDI testing.

(56) References Cited

U.S. PATENT DOCUMENTS

| | | | |
|---|---|---|---|
| 5,779,891 | A | 7/1998 | Andelman |
| 5,788,826 | A | 8/1998 | Nyberg |
| 5,954,937 | A | 9/1999 | Farmer |
| 5,980,718 | A | 11/1999 | Van Konynenburg et al. |
| 6,022,436 | A | 2/2000 | Koslow et al. |
| 6,127,474 | A | 10/2000 | Andelman |
| 6,309,532 | B1 | 10/2001 | Tran et al. ............... 205/687 |
| 6,325,907 | B1 | 12/2001 | Andelman |
| 6,346,187 | B1 | 2/2002 | Tran et al. |
| 6,413,409 | B1 | 7/2002 | Otowa et al. |
| 6,416,645 | B1 | 7/2002 | Sampson et al. |
| 6,462,935 | B1 | 10/2002 | Shiue et al. |
| 6,482,304 | B1 | 11/2002 | Emery et al. |
| 6,569,298 | B2 | 5/2003 | Merida-Donis |
| 6,580,598 | B2 | 6/2003 | Shiue et al. |
| 6,628,505 | B1 | 9/2003 | Andelman |
| 6,661,643 | B2 | 12/2003 | Shiue et al. |
| 6,709,560 | B2 | 3/2004 | Andelman et al. |
| 6,778,378 | B1 | 8/2004 | Andelman |
| 6,781,817 | B2 | 8/2004 | Andelman |
| 6,798,639 | B2 | 9/2004 | Faris et al. |
| 6,805,776 | B2 | 10/2004 | Faris |
| 7,563,351 | B2 | 7/2009 | Wilkins et al. ............ 205/687 |
| 8,002,963 | B2 | 8/2011 | Andelman et al. .......... 205/687 |
| 8,038,867 | B2 | 10/2011 | Du et al. .................. 205/744 |
| 2002/0084188 | A1 | 7/2002 | Tran et al. |
| 2002/0154469 | A1 | 10/2002 | Shiue et al. |
| 2002/0167782 | A1 | 11/2002 | Andelman et al. .......... 361/302 |
| 2003/0029718 | A1 | 2/2003 | Faris |
| 2003/0063430 | A1 | 4/2003 | Shiue et al. |
| 2003/0098266 | A1 | 5/2003 | Shiue et al. ............... 210/87 |
| 2003/0189005 | A1 | 10/2003 | Inoue et al. |
| 2004/0012913 | A1 | 1/2004 | Andelman |
| 2004/0013918 | A1 | 1/2004 | Merida-Donis |
| 2004/0038090 | A1 | 2/2004 | Faris ......................... 429/12 |
| 2004/0095706 | A1 | 5/2004 | Faris et al. ................ 361/303 |
| 2004/0188246 | A1* | 9/2004 | Tran et al. ................ 204/267 |
| 2005/0079409 | A1* | 4/2005 | Andelman et al. ......... 429/94 |
| 2005/0103634 | A1 | 5/2005 | Andelman et al. |
| 2006/0144765 | A1* | 7/2006 | Skwiot ...................... 210/85 |
| 2007/0108056 | A1* | 5/2007 | Nyberg et al. ............. 204/554 |
| 2007/0144898 | A1* | 6/2007 | Oldani et al. ............. 204/286.1 |
| 2007/0158185 | A1 | 7/2007 | Andelman et al. |
| 2007/0284313 | A1* | 12/2007 | Lee et al. .................. 210/746 |
| 2008/0144256 | A1 | 6/2008 | Cai et al. .................. 361/502 |
| 2009/0045048 | A1 | 2/2009 | Bourcier et al. ........... 204/519 |
| 2010/0065438 | A1 | 3/2010 | Sullivan .................... 205/748 |
| 2010/0065439 | A1 | 3/2010 | Sullivan et al. ............ 205/748 |
| 2010/0230277 | A1 | 9/2010 | Sullivan et al. ............ 204/633 |
| 2012/0217170 | A1 | 8/2012 | Van Der Wal et al. ....... 428/632 |

OTHER PUBLICATIONS

International Search Reports of similar cases. PCT/US2009/005114; PCT/US2009/005106; PCT/US2009/005115.

Blair, JW; Murphy GW, "Electrochemical Demineralization of Water with Porous Electrodes of Large Surface Area", Symposium on Saline Water Conversion, National Academy of Sciences, National Research Council Publication 568, 1957; p. 196.

Blair, GW; Murphy, GW; "Non-Equilibrium Thermodynamics of Transference Cells, Cells Without Transference, and Membrane Demineralization Processes", Advances Chemistry Series I960, vol. 27, p. 206.

Murphy GW ; "Electrochemical Desalting of Water with Electrodes of Large Surface Area"; DeChema-Monographien, . Proceedings of the European Symposium "Fresh Water from the Sea", European Federation of Chemical Engineers, Athens May 31-Jun. 4, 1962;Verlag Chemie GMBH, Weinheim/Bergstrasse, 1962, vol. 47, No. 781-834, p. 639.

Murphy GW, Blomfield JJ, Smith FW, Neptune WE, Purdue JO, Candle D, Stevens AL, Tucker J, North Wood E, Tague L, Lawson M, Rose R and James D; "Demineralization of saline water by electrically-induced adsorption on porous carbon electrodes" ; Saline Water Conversion R&D Progr. Rept #92, PB181589, Office of Saline Water, US Dept. of the Interior, Mar. 1964.

Murphy GW, Blomfield JJ, Smith FW, Neptune WE, Candle D, Stevens AL, Tucker J, North Wood E, Tague L, Arnold BB, Blair ;JW and Satter A..; "Demineralization of saline water by electrically-induced adsorption on porous carbon electrodes"; Saline Water Conversion R&D.

Murphy GW, Hock R, Caudle D, Papastamataki A, Tucker JH, and Wood EN; "Electrochemical demineralization of water with carbon electrodes"; Saline Water Conversion R&D Progr. Rept #140, Office of Saline Water, US Dept. of the Interior 1965.

Caudle DD, Tucker JH, Cooper JL, Arnold BB, Papastamataki A, Wood EN, Hock R and Murphy GW; "Electrochemical demineralization of water with carbon electrodes"; Saline Water Conversion R&D Progr. Rept #188, Office of Saline Water, US Dept. of the Interior 1966.

Murphy, GW; Caudle, DD; "Mathematical theory of electrochemical demineralization in flowing systems"; Electrochimica ACTA 1967, vol. 12, p. 1655.

Murphy GW and Cooper JL; "Activated carbon used as electrodes in electrochemical demineralization of saline water"; Saline Water R&D Conversion Progr. Rept #399, Office of Saline Water, US Dept. of the Interior 1968.

Johnson, A. M., Newman, J.; "Desalting by Means of Porous Carbon Electrodes"; Journal of the Electrochemical Society; 1971. vol. 130, p. 510.

Oren, Y., Soffer, A.; "Water Desalting by Means of Electrochemical Parametric Pumping. 1. The Equilbrium Properties of a Batch Unit-Cell"; Journal of Applied Electrochemistry, 1983. vol. 13, p. 473-487.

Oren, Y., Soffer, A.; "Water Desalting by Means of Electrochemical Parametric Pumping. 2. Separation Properties of a Multistage Column"; Journal of Applied Electrochemistry 1983, vol. 13, pp. 489-505.

Ganzi, G.C., Wood, J.H., and Griffin, C. S.; "Water-purification and Recycling Using the CDI Process"; Environmental Progress, 1992, vol. 11, pp. 49-53.

University of Oklahoma Research Institute, Norman; "Demineralization of saline water by electrically-induced adsorption on porous graphite electrodes"; Saline Water R&D Conversion Progr. Rept #45, Office of Saline Water, US Dept. of the Interior, 1960.

Departments of Chemistry, University of Oklahoma and Normal Oklahoma Baptist University Shawnee; "Demineralization of Saline Water by Electrically-Induced Adsorption on Porous Carbon Electrodes"; Saline Water Conversion R&D Progr. Rept #58, Office of Saline Water, US Dept. of the Interior, 1962.

Farmer, J. C., Fix, D. V., Mack, G. V., Pekala, R. W., & Poco, J. F. 1195, "Capacitive deionization of water: An innovative new process", in Proceedings of the 1995 5th International Conference on Radioactive Waste Management and Environmental Remediation. Part 2 (of 2), Sep. 3-7, 1995, A SME, New York, NY, USA, Berlin, Ger, pp. 1215-1220.

Farmer, J. C., Fix, D. V., Mack, G. V., Pekala, R. W., & Poco, J. F. "Capacitive deionization with carbon aerogel electrodes: carbonate, sulfate, and phosphate", pp. 294-304.

Farmer, J. C., Fix, D. V., Mack, G. V., Pekala, R. W., & Poco, J. F. 1996, "Capacitive Deionization of Na Cl and Na NO[sub 3] Solutions with Carbon Aerogel Electrodes", Journal of the Electrochemical Society, vol. 143, No. 1, pp. 159-169.

JB Lee, KK Park, HM Eum, CW Lee. "Desalination of a thermal power plant wastewater by membrane capacitive deionization." Desalination. vol. 196, pp. 125-134. (2006).

TJ Welgemoed, CF Schutte, "Capacitive Deionization Technology™: An alternative desalination solution." Desalination, vol. 183, pp. 327-340. (2005).

* cited by examiner

Exploded view of the materials used for CDI testing.

Cross sectional view of an assembled CDI test cell before compression.

Cross sectional view of an assembled CDI test cell after compression.

Schematic of the test apparatus used for CDI testing.

Example test cycle illustrating TDS variation during the cycle.

Cross section of the CDI test cell showing the location of the reference electrode, (70).

Illustration of Ion Capacity—defined as the integrated area between the incoming TDS and the measured TDS at the outlet of the cell.

METHOD OF REGENERATING A CAPACITIVE DEIONIZATION CELL

CROSS REFERENCE TO RELATED APPLICATION

This application claims the benefit of commonly owned and U.S. Provisional Application No. 61/096,907 filed on Sep. 15, 2008.

BACKGROUND OF THE INVENTION

Capacitive deionization (CDI) cells are known for purifying or otherwise deionizing liquids such as water. For example, U.S. Pat. No. 5,954,937 discloses an electrically regeneratable electrochemical cell for capacitive deionization and electrochemical purification and regeneration of electrodes including two end plates, one at each end of the cell. Two end electrodes are arranged one at each end of the cell, adjacent to the end plates. An insulator layer is interposed between each end plate and the adjacent end electrode. Each end electrode includes a single sheet of conductive material having a high specific surface area and sorption capacity. In one embodiment of this disclosure, the sheet of conductive material is formed of carbon aerogel composite. The cell further includes a plurality of generally identical double-sided intermediate electrodes that are equidistally separated from each other, between the two end electrodes. As the electrolyte enters the cell, it flows through a continuous open serpentine channel defined by the electrodes, substantially parallel to the surfaces of the electrodes. By polarizing the cell, ions are removed from the electrolyte and are held in the electric double layers formed at the carbon aerogel surfaces of the electrodes. As the cell is saturated with the removed ions, the cell is regenerated electrically, thus minimizing secondary wastes.

U.S. Pat. No. 6,709,560 discloses flow-through capacitors that are provided with one or more charge barrier layers. Ions trapped in the pore volume of flow-through capacitors cause inefficiencies as these ions are expelled during the charge cycle into the purification path. A charge barrier layer holds these pore volume ions to one side of a desired flow stream, thereby increasing the efficiency with which the flow-through capacitor purifies or concentrates ions.

These references all produce useful CDI cells, but a CDI cell that performs better is still needed. For example, over time there is an excess ion buildup in a CDI cell that adversely affects pure flow rate and flow efficiency. It is desirable to provide for a method of operating a CDI cell to regenerate it and ameliorate these problems.

As used herein, "effective capacitance" means dQ/dV for a membrane-electrode conjugate as determined by current interrupt as described herein.

Also as used herein, "durability" means hours until ion removal is less than 60% (under test conditions specified herein).

SUMMARY OF THE INVENTION

The present invention provides a method for efficiently softening water comprising:

(1) Assembling a cell comprising a cathode current collector, a first electrode capable of absorbing ions, a cation selective membrane, a spacer, an ion selective membrane, a second electrode capable of adsorbing ions, and an anode current collector;

(2) Collecting of a stream of clean water at a flow rate of F1, while applying a charge voltage of between about 0.5V and about 1.3V between said cathode current collector and said anode current collector for a first period of time, T1;

(3) Collecting a stream of waste water at a second flow rate, F2, while applying a discharge voltage between about −1.3 and about −0.5 V between said cathode current collector and said anode current collector for a second period of time, T2;

(4) Repeating steps (2) and (3) C times;

(5) Applying a regeneration voltage between 0.0 V and −1.3 V at flow rate, F3, for a period of time, T3 such that $F1*T1*C/[F1*T1*C+F2*T2*C+F3*T3]$ is greater than or about equal to 0.7.

DETAILED DESCRIPTION OF THE INVENTION

Applicants have discovered that a regeneration cycle for a CDI cell greatly improves cell efficiency and pure flow rate. Incorporating an extending discharge cycle (the regeneration cycle) into the CDI operation, for example a five minute cycle per hour (compared to one minute charge and 30 second discharge cycles) bring the TDS of the cell back to near the original value. As used herein, "efficiency" means maximizing the amount of water cleaned per unit area electrode.

Figure 1:
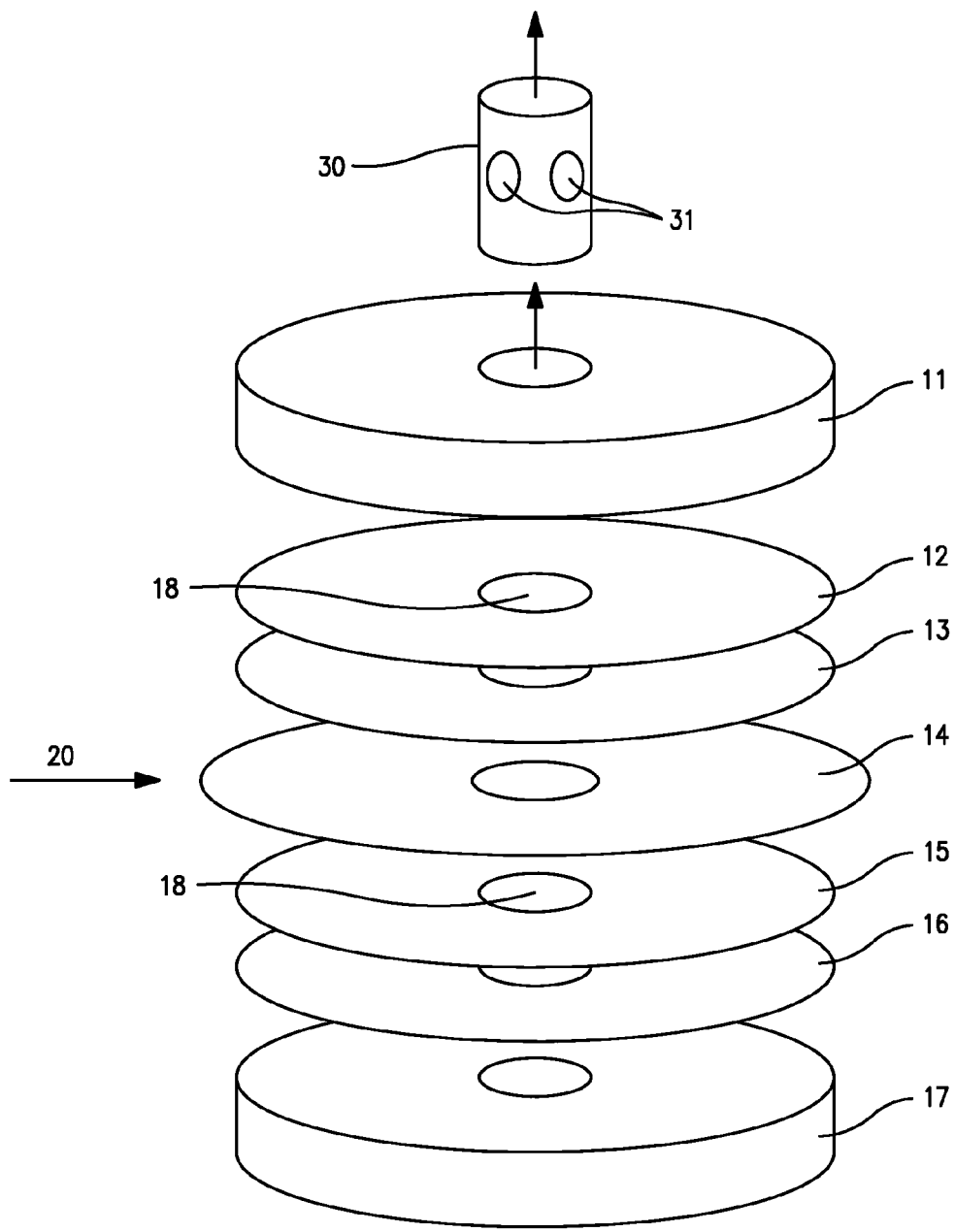
FIG. 1 is an exploded view of an exemplary embodiment of the invention.

An exploded view of the inside of a CDI cell according to an exemplary embodiment of the present invention is illustrated schematically in FIG. 1. The cell consists of a stack of discs, consisting in order, of an anion electrode, 12, an anion selective membrane, 13, a woven spacer, 14, that serves as a fluid flow path, a cation selective membrane, 15, and a cation electrode, 16. The stack of materials is compressed between two conductive graphite carbon blocks (POCO Graphite, Inc.), 11 and 17, which serve as electrical contacts to the electrodes. During the charging, or purification cycle, the anion electrode contacting graphite carbon block, 11, is electrically connected to the positive terminal of the power supply. The cation electrode contacting graphite carbon block, 17 is connected to the negative terminal of the power supply. A plurality of such cells may be used, in series or in parallel, in alternative embodiments of the invention.

The anion and cation electrodes, (12) and (16) are cut from sheets, composed of activated carbon, conductive carbon black and a PTFE binder. Electrodes of this type are widely used in electric double layer capacitors. In these tests, electrodes of varying thickness were obtained from Japan Gore-Tex, Inc., Okayama, Japan. The dimensions of the electrodes in the cell of this embodiment are 3" in diameter, and have a 0.5" diameter hole (18) in the center to allow the treated water to pass out of the cell.

The anion membrane (13) is cut from sheets of NEOSEPTA AM1 (Amerida/ASTOM). The dimensions are 3" OD with a 0.5" ID. The cation membrane (15) is cut from sheets of NEOSEPTA CM1 (Amerida/ASTOM). The spacer, 14, is a 3.25" OD×0.5" ID disc cut from a 0.004" woven polyester screen.

The flow of water into the cell is radial, with water entering the cell from the outside edge of the spacer, (14), and flowing out the center exit tube, (30). Holes (31) are positioned in the center exit tube to enable water to flow from the spacer into the tube.

Figure 2A:
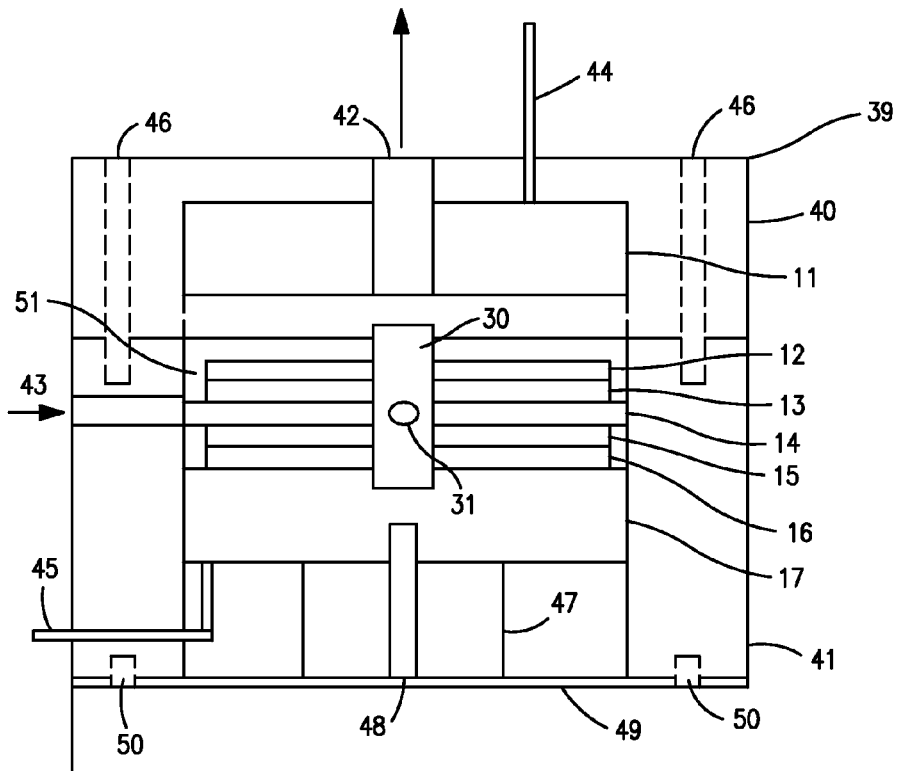
FIG. 2a is a cross sectional view of an assembled CDI cell according to an exemplary embodiment of the invention before compression.
Figure 2B:
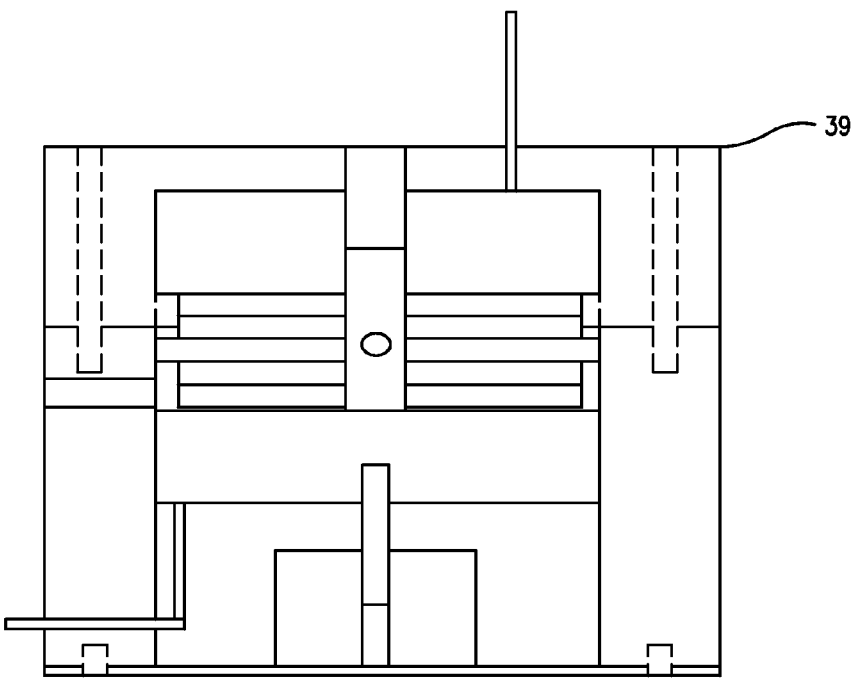
FIG. 2b is a cross sectional view of an assembled CDI cell according to an exemplary embodiment of the invention after compression.

A cross section of exemplary cell components as assembled in an exemplary cylindrical cell housing, (39), are shown in FIG. 2a. The housing consists of a top half (40) and a bottom half (41), joined by means of 4 bolts (46). The cation contacting graphite carbon block, (17) is mounted to a pneumatically actuated air cylinder (47). The cell components, 12-16 are stacked on top of the carbon block (17), and around the exit tube (30). The anion contacting carbon block (11), is rigidly mounted to the top half to the housing (40). Electrical leads 44 and 45 connect the anion contacting carbon block (11) and the cation contacting carbon block (17) to the power supply. Water is brought into the cell through the water inlet (43) and fills the circular cavity (51) surrounding the cell components (12-16). The water flows radially through the spacer (14) and exits the cell via holes (31) in the exit tube (30) and the cell water outlet (42). The pneumatic cylinder is mounted to a base (49), which is attached to the bottom half of the housing (41) by means of bolts (50). The air cylinder piston (48) is mounted to the cation contacting carbon block 17. When the air cylinder is activated the air cylinder piston is extended from the air cylinder, raising (17) and compressing the cell assembly as shown in FIG. 2b.

Figure 3:
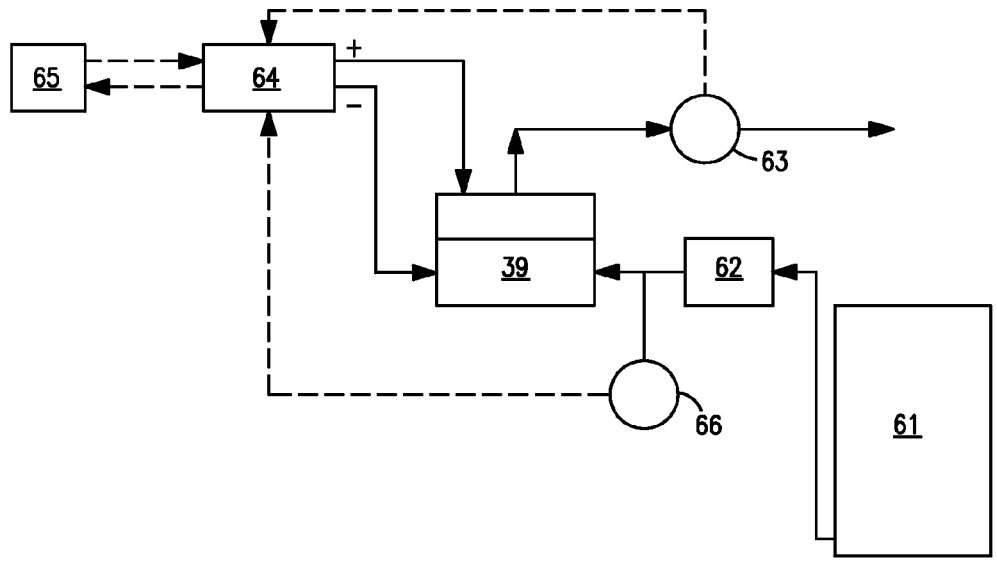
FIG. 3 is a schematic of the test apparatus used for CDI testing.

In operation of this exemplary embodiment, as shown in FIG. 3, water is pumped from a reservoir, (61), via a peristaltic pump (62) into the cell (39). Treated water is analyzed with a conductivity probe (63). The output of the conductivity probe is converted to total dissolved solids (TDS), based on a NaCl calibration. Power is applied to the cell by means of an programmable battery cycle tester (64)(ARBIN BT2000). Potential, current and conductivity are recorded as a function of time on a computer (65). The inlet pressure to the cell is monitored by an inlet pressure transducer (66), whose output can optionally be included in the ARBIN (64).

Figure 4:
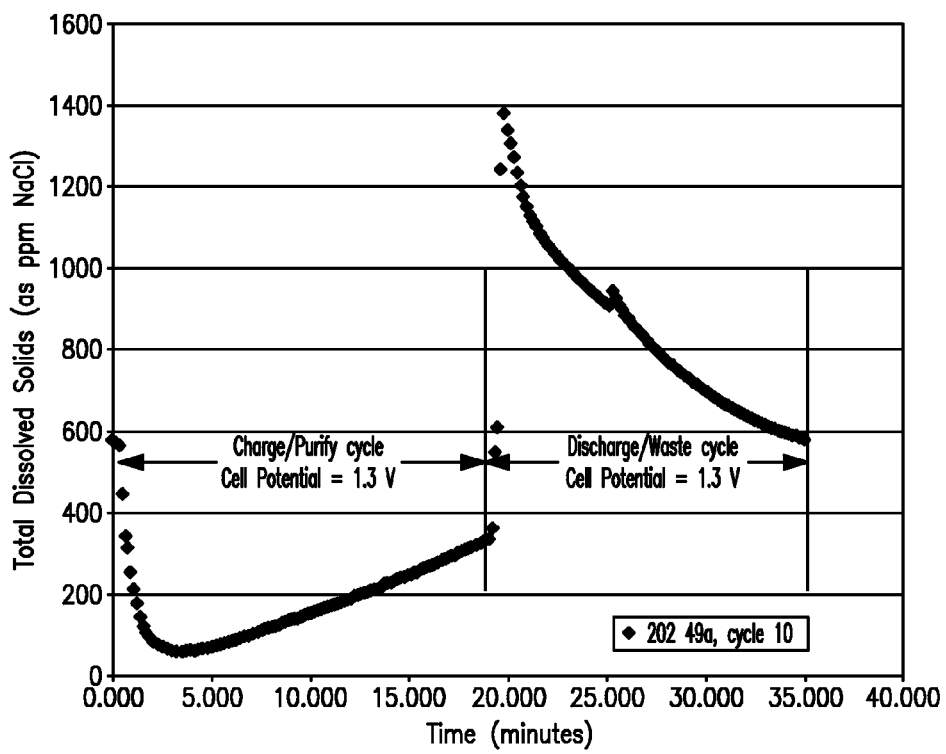
FIG. 4 is a graph of an Example test cycle illustrating TDS variation during the cycle.

The cell TDS can be utilized as a set point by the battery cycle tester in the controlling charge and discharge cycles. Inlet water TDS is nominally 480 ppm. At the beginning of the charge cycle, the TDS rapidly declines to some minimum value (see FIG. 4). After reaching the minimum value, TDS increases slowly. Typically charge cycles are conducted until the product TDS reaches 320 ppm, at which point the polarity of the potential is reversed, causing the cell to discharge. There is a rapid increase in current and TDS on discharge. After reaching a peak, the TDS decreases and the discharge is typically allowed to proceed until the product TDS falls to 580 ppm.

EXAMPLES

Figure 5:
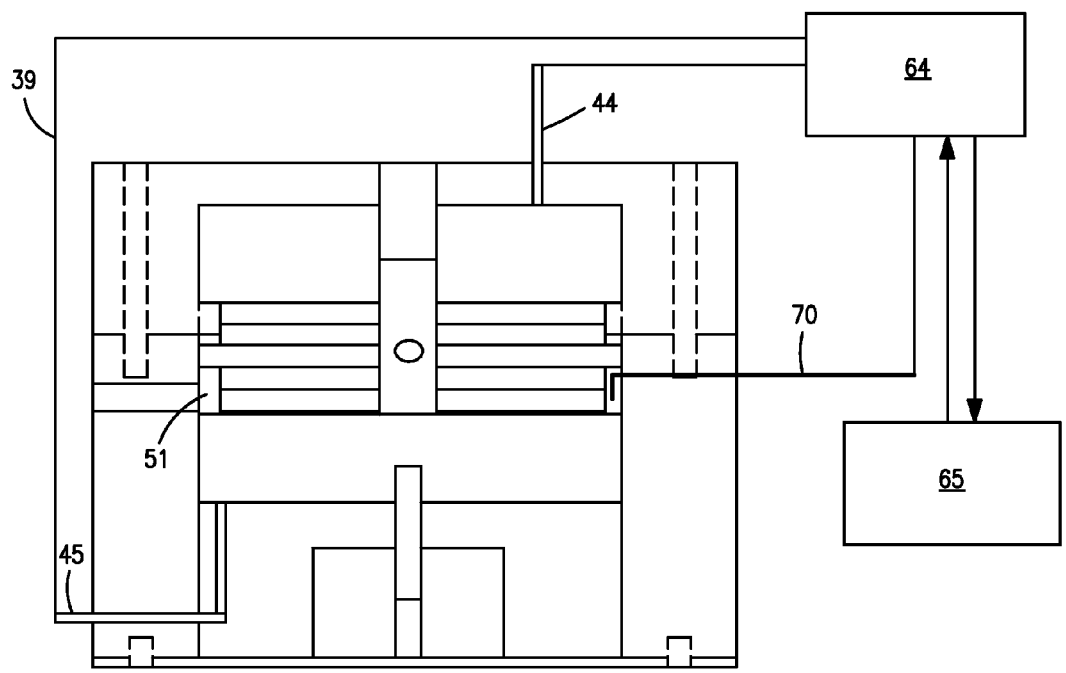
FIG. 5 is a cross section of an exemplary CDI test cell showing the location of the reference electrode, (70).
Figure 6:
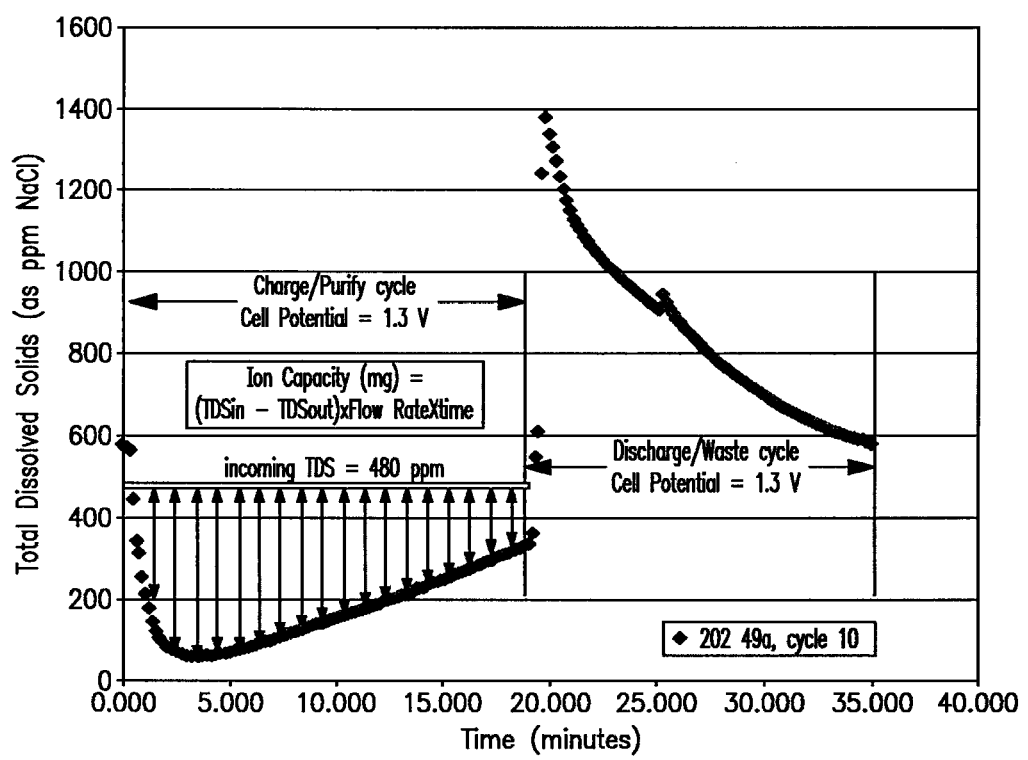
FIG. 6 is a graph of TDS vs time.

In some experiments it was considered useful to employ a Ag/AgCl reference electrode (see FIG. 5) (70) to determine how the potential split between the two electrodes. The position of the reference electrode is shown in FIG. 5. Positioned in the circular cavity (51) surrounding the cell components, the solution potential should be constant. The chloride activity of the test water was estimated to be 0.00356 M using Debye-Huckle approximations for the activity coefficient. From this activity, the potential of the reference electrode was determined to be 0.367V vs. the standard hydrogen electrode. Protocols could be programmed that enabled a short open circuit condition, or a so called current interrupt. This protocol enabled in-situ determination of the potential of each electrode, free of cell IR.

Electrodes

Activated Carbon Electrodes in thicknesses of 800 micron, were obtained from Japan Gore-Tex. These electrodes are marketed commercially for electrolytic double layer capacitor, and particularly for coin cell applications.

Membranes

Cation Membrane was GORE SELECT (GS018950-44us) produced by W.L. GORE & Associates, Inc. Anion membrane was FUMASEP FAB 30 um non-brominated (lot MI0507-140), obtained from FUMATECH GmbH.

Spacer

The spacer was a woven polyester screen, 0.004" thick, 180 threads per inch, PETENYL, obtained from Tenyl Tecidos Técnicos Ltda, Brazil.

Test Water

A test water made to simulate a "hard" tap water was formulated using the following recipe.

| | |
|---|---|
| Calcium chloride dehydrate (CaCl2•2H2O) | 293.6 mg/L |
| Sodium bicarbonate (NaHCO3) | 310.7 mg/L |
| Magnesium sulfate heptahydrate (MgSO4•7H2O) | 246.5 mg/L |

The resulting water had a total hardness of 300 mgCaCO3/L, calcium hardness of 200 mg/L, alkalinity 185 mg CaCO3/L and a pH of approximately 8.0.

Figure 7:
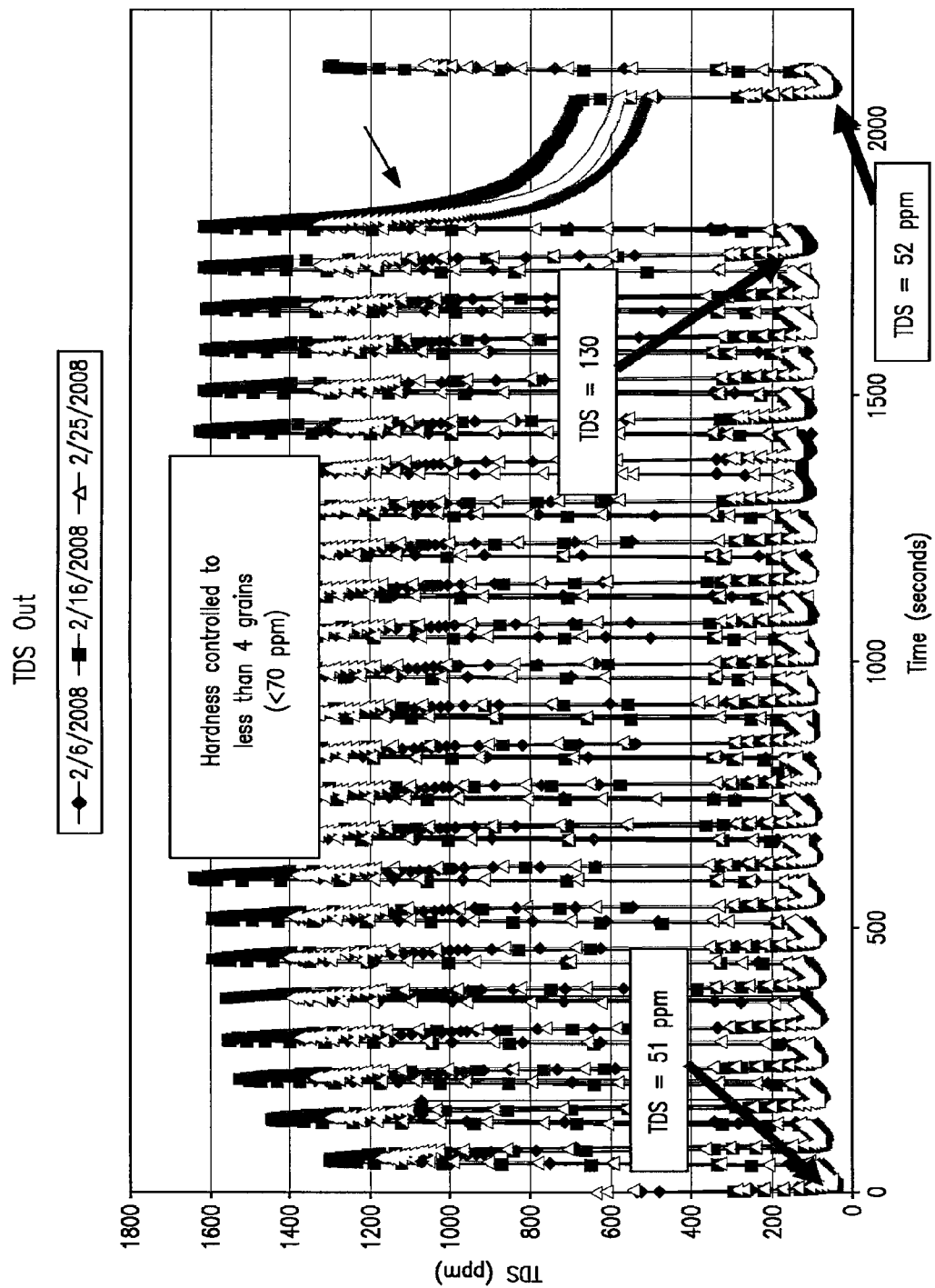
FIG. 7 is a graph of TDS vs time.

As illustrated in FIG. 7, examples were run on three different dates according to the disclosure herein. The starting TDS for each was approximately 51 ppm. After approximately half an hour, the TDS level had risen to 130, at which time a regeneration cycle was performed. This regeneration cycle lowered the TDS back to 52 ppm. The graph indicates that the regeneration cycle in fact cleaned the cell, allowing for greater pure flow rates and flow efficiency.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A method for efficiently softening water in a cell comprising a water inlet, a water outlet, a cathode current collector and an anode current collector, the method comprising:
    during a charge cycle, creating a stream of clean water in a direction from the inlet to the outlet at a flow rate F1, while applying a charge voltage of between about 0.5V and about 1.3V between the cathode current collector and the anode current collector of a cell for a period of time T1;
    during a discharge cycle, creating a stream of waste water in the direction from the inlet to the outlet at a flow rate F2, while applying a discharge voltage between about −1.3V and about −0.5 V between the cathode current collector and the anode current collector for a period of time T2;

repeating the charge and discharge cycles C times, wherein C>1; and applying a regeneration voltage between 0.0 V and −1.3 V between the cathode current collector and the anode current collector to a stream of water in the direction from the inlet to the outlet at a flow rate F3, for a period of time T3 such that $F1*T1*C/[F1*T1*C+F2*T2*C+F3*T3]$ is greater than or about equal to 0.7, wherein T3 is greater than T2.

2. The method of claim 1, wherein the cell further comprises (i) a spacer, (ii) a first electrode capable of absorbing ions, (iii) a second electrode capable of adsorbing ions, and (iv) a cation selective membrane, an anion selective membrane, or both.

3. The method of claim 1, wherein T1 is 2 times T2.

4. The method of claim 1, wherein T1 is 1 minute and T2 is 30 seconds.

5. The method of claim 1, further comprising:
determining total dissolved solids in the clean water; and
controlling the charge and discharge cycles using the determined total dissolved solids.

6. The method of claim 5, wherein determining total dissolved solids comprises utilizing a conductivity probe to analyze the clean water.

7. The method of claim 1, wherein T1 is greater than T2.

8. The method of claim 1, wherein the charge voltage is substantially equal to the discharge voltage.

9. The method of claim 1, wherein C is greater than or equal to 3.

* * * * *